United States Patent
Beattie et al.

[11] Patent Number: 5,865,626
[45] Date of Patent: Feb. 2, 1999

[54] MULTI-DIALECT SPEECH RECOGNITION METHOD AND APPARATUS

[75] Inventors: Valerie L. Beattie, Burlington; David R. H. Miller, Cambridge, both of Mass.; Shawn Eric Edmondson, Indianapolis, Ind.; Yogen N. Patel, Philadelphia, Pa.; Geoffrey A. Talvola, Somerville, Mass.

[73] Assignee: GTE Internetworking Incorporated, Cambridge, Mass.

[21] Appl. No.: 705,742

[22] Filed: Aug. 30, 1996

[51] Int. Cl.⁶ .................................................. G09B 19/04
[52] U.S. Cl. .................................... 434/185; 704/240
[58] Field of Search ........................... 434/185; 704/236, 704/240, 250, 255, 256

[56] References Cited

U.S. PATENT DOCUMENTS

| | | | |
|---|---|---|---|
| 4,587,670 | 5/1986 | Levinson et al. | 381/43 |
| 4,783,804 | 11/1988 | Juang et al. | 381/43 |
| 4,903,305 | 2/1990 | Gillick et al. | 381/41 |
| 4,975,959 | 12/1990 | Benbassat | 381/41 |
| 5,033,087 | 7/1991 | Bahl et al. | 381/43 |
| 5,129,000 | 7/1992 | Tanaka | 381/42 |
| 5,268,990 | 12/1993 | Cohen et al. | 395/2 |
| 5,581,655 | 12/1996 | Cohen et al. | 395/2.54 |
| 5,636,325 | 6/1997 | Farrett | 395/2.67 |
| 5,679,001 | 10/1997 | Russell et al. | 434/185 |

OTHER PUBLICATIONS

John Makhoul and Richard Schwartz, State of The Art In Continuous Speech Recognition, Oct. 1995.
George Yu, Herbert Gish, Identification Of Speakers Engaged In Dialog Apr. 27–30,1993.

*Primary Examiner*—Robert A. Hafer
*Assistant Examiner*—John Edmund Rovnak
*Attorney, Agent, or Firm*—Leonard Charles Suchyta

[57] ABSTRACT

Apparatus and method for improving the speed an accuracy of recognition of speech dialects, or speech tansferred via dissimilar channels is described. The invention provides multiple models tailored to specific segments or dialects, and/or speech channels, of the population. However, there is not a proportional increase in recognition time or computing power or computing resources needed. Probability density functions for the acoustic descriptors are provided which are shared among the various models. Since there is a common pool of probability density functions which are mapped or pointed to for the different acoustic descriptors for each different dialect or speech channel model, the memory requirements for the speech recognition apparatus and method are significantly reduced. Each model is comprised of triphonemes which are modelled by discrete probability distribution functions forming hidden Markov models or statistical word models. Any one probability density function is assigned or mapped to many different triphonemes in many different dialects or different models. The invention provides for an automatic selection of the best model in real time wherein the best fit is determined by a voting process.

12 Claims, 3 Drawing Sheets

MULTI-DIALECT SPEECH RECOGNITION METHOD AND APPARATUS

FIELD OF INVENTION

This invention relates to the general field of speech recognition and more specifically to the area of speech recognition method and apparatus adapted to identify and accommodate differences in speech based on dialectic, channel, noise, or other variations.

BACKGROUND OF INVENTION

Speech recognition has been limited, even in the face of substantial progress, by the accuracy of such recognition, the speed of recognition and by the resources needed to perform such recognition. An aspect of the accuracy has been the errors due to the variation of language and pronunciation of the speakers, i.e. the dialects. Another aspect of the accuracy has been the errors due to variability in the apparatus by which speech is captured and transmitted, i.e. the channels (including noise). One solution is to have many models for as many dialects as possible. But with more models the recognition is slower and more resources, e.g. memory, computer speed and power, are needed.

Although at present it is possible to design systems that perform nearly 100% accuracy in real time for one or a few speakers, a persistent object in the art is to provide high accuracy recognition of utterances made in dissimilar manners, or under dissimilar circumstances, or surrounding, or with dissimilar electronics (microphones, computers, etc.).

A paper entitled, State of the Art in Continuous Speech Recognition, was published in the Proceedings of the National Academy of Science, USA, Vol. 92, pp. 9956–9963, October 1995, authored by John Makhoul and Richard Schwartz. This paper is hereby incorporated by reference herein as if laid out in full. The authors wrote the paper under the auspices of BBN Systems and Technology, Cambridge Mass., the same assignee of the present patent. The paper discloses three major factors in speech recognition, linguistic variability, speaker variability and channel variability. Channel variability includes the effects of background noise and the transmission apparatus, e.g. microphone, telephone, echoes, etc. The paper discusses the modelling of linguistic and speaker variations. An approach to speech recognition is to use a model, a logical finite-state machine where transitions and outputs are probabilistic, to represent each of the groups of three (or two) phonemes found in speech. The models may have the same structure but the parameters in the models are given different values. In each model there is a hidden Markov model (HMM). HMM is a statistical artifact that is well discussed in the above paper and the references listed therein, and is not be described in depth herein. FIG. 5 of the paper, reproduced herein as prior art FIG. 1, describes an approach to speech recognition. The system is trained by actual speakers articulating words continuously. The audio signal is processed and features are extracted. The signal is often smoothed by filtering by hardware or by software (if digitized and stored), followed by mathematical operations on the resulting signal to form features which are computed periodically, say every 10 milliseconds or so. Continuous speech is marked by sounds or phonemes that are connected to each other. The two adjacent phonemes on either side of a given phoneme have a major effect, referred to as co-articulation, on the articulation of the center phonemes. Triphoneme is the name given to the different articulation of a given phoneme due to the affects of these side phonemes. The continuous speech is divided into discrete transformed segments that facilitate the several mathematical operations. Many types of features have been used including, time and frequency masking, taking of inverse Fourier transforms resulting in a mathematical series of which the coefficients are retained as a feature vector. The features are handled mathematically as vectors to simplify the training and recognition computations. Other features may include volume, frequency range, and amplitude dynamic range. Such use of vectors is well known in the art, and reference is found the Makhoul and Schwartz paper on page 9959 et seq. The spoken words used in the training are listed in a lexicon and a phonetic spelling of each word is formed and stored. Phonetic word models using HMMs are formed from the lexicon and the phonetic spellings. These HMM word models are iteratively compared to the training speech to maximized the likelihood that the training speech was produced by these HMM word models. The iterative comparing is produced by the Baum-Welch algorithm which is guaranteed to converge to form a local optimum. This algorithm is well known in the art as referenced in the Makhoul and Schwartz paper on page 9960. A grammar is established and with the lexicon a single probabilistic grammar for the sequences of phonemes is formed. The result of the recognition training is that a particular sequence of words will corresponds with a high probability to a recognized sequence of phonemes. Recognition of an unknown speech begins with extracting the features as in the training stage. All word HMM model sequences allowed by the grammar are searched to find the word (and therefore the triphoneme) sequence with the highest probability of generating that particular sequence of feature vectors. Prior art improvements have included development of large databases with large vocabularies of speaker independent continuous speech for testing and development. Contextual phonetic models have been developed, and improved recognition algorithms have been and are being developed. Probability estimation techniques have been developed and language models are being improved. In addition, computers with increased speed and power combined with larger, faster memories have improved real time speech recognition. It has been found that increased training data reduces recognition errors, and tailored speaker dependent training can produce very low error rates.

The portion of the Makhoul and Schwartz paper on page 9962, labeled Adaptation, describes incremental improvements in speaker independent systems. The problems and limitations of a new dialect are addressed. The paper states that "incremental adaptation could require hours . . . and . . . patience . . . before the performance becomes adequate." It is suggested, in the next paragraph, that a short training session may be used to transform an existing model for a new speaker. The improvement is not quantified, however. But, with all the advances in speech recognition, limitations on computing resources persist, multiple models still consume large amounts of memory, and fast, powerful computers are needed to recognize continuous, real time speech, and different dialects remain a problem. The present invention is directed to these problems.

It is an object of the present invention to provide a speech recognition system with a large number of models for dialects and/or channels (hereinafter "channel" is inclusively defined as the audio path, speech impediments, noise and acoustic suroundings, the electronics, wireless paths, wire paths) without a proportional increase in computing power and memory.

An object of the present invention is to provide models for speech dialects and/or channels which produce high accuracy in real time for a large variety of speakers.

It is yet another object of the present invention to provide an automatic selection of the best model for use with different speakers in real time.

It is another object of the present invention to provide a more accurate speech recognition system for discontinuous and continuous speech.

SUMMARY OF THE INVENTION

The foregoing objects are met in apparatus and a method including, a method of modelling speech for a segmented population of speakers, each segment forming a dialect, including: compiling utterances of words from each dialect, extracting a set of features from the utterances of each population segment, compiling a database of acoustic descriptors of said utterances for each dialect, establishing a database of probability density functions associated with said utterances, relating said probability density functions with said acoustic descriptors of all said dialects, wherein at least one probability density functions is related or mapped to at least two acoustic descriptors in at least two respective dialects, and combining said features, said acoustic descriptor and said probability density functions together to determine the best model for each dialect. The probability density functions form a common database shared by all the dialects. The model is formed by mapping the probability density function to the acoustic descriptors. The acoustic descriptors are in a preferred embodiment phonemes or triphonemes.

Although a preferred embodiment of this invention relates to multi-dialect speech recognition, the present invention can be used to advantage for speech recognition where the audio travels through and is operated on by dissimilar channels, i.e. electronics, and/or wireless or wire paths. In this case the speech data would be segmented into subsets corresponding to different channels, for example, data transmitted over celluar telephone networks and data transmitted over standard wireline telephone networks.

A lexicon is generated and the phonetic spellings of the words in the lexicon is formed for those respective words. These number of words includes the words to be recognized. When the combining of the features, the acoustic descriptors and the probability density functions result in a statistic word model, or an HMM word model.

The recognition of the dialect of an unknown speaker includes the extraction of the features from the unknown speech and determining the acoustic descriptors with the map of associated probability density functions for each dialect. The probabilities are calculated for the unknown utterance as compared to the word models of each dialect. The highest probability relates to the best fitting dialect for the unknown speech. When multiple utterances are analyzed as set forth above more than one dialect may be determined as being best. In this case the dialect most often found to be best is used as the dialect for the unknown speech. A weighted comparison that minimizes the error rate is used in another preferred embodiment.

In a preferred embodiment, the formation of statistical word models and a grammar, suitable for the language being modelled, are combined to form recognized sentences. There are action associated with some sentences and such actions are activated when such sentences are recognized.

Other objects, features and advantages will be apparent from the following detailed description of preferred embodiments thereof taken in conjunction with the accompanying drawings in which:

DETAILED DESCRIPTION OF PREFERRED EMBODIMENTS

Figure 1:
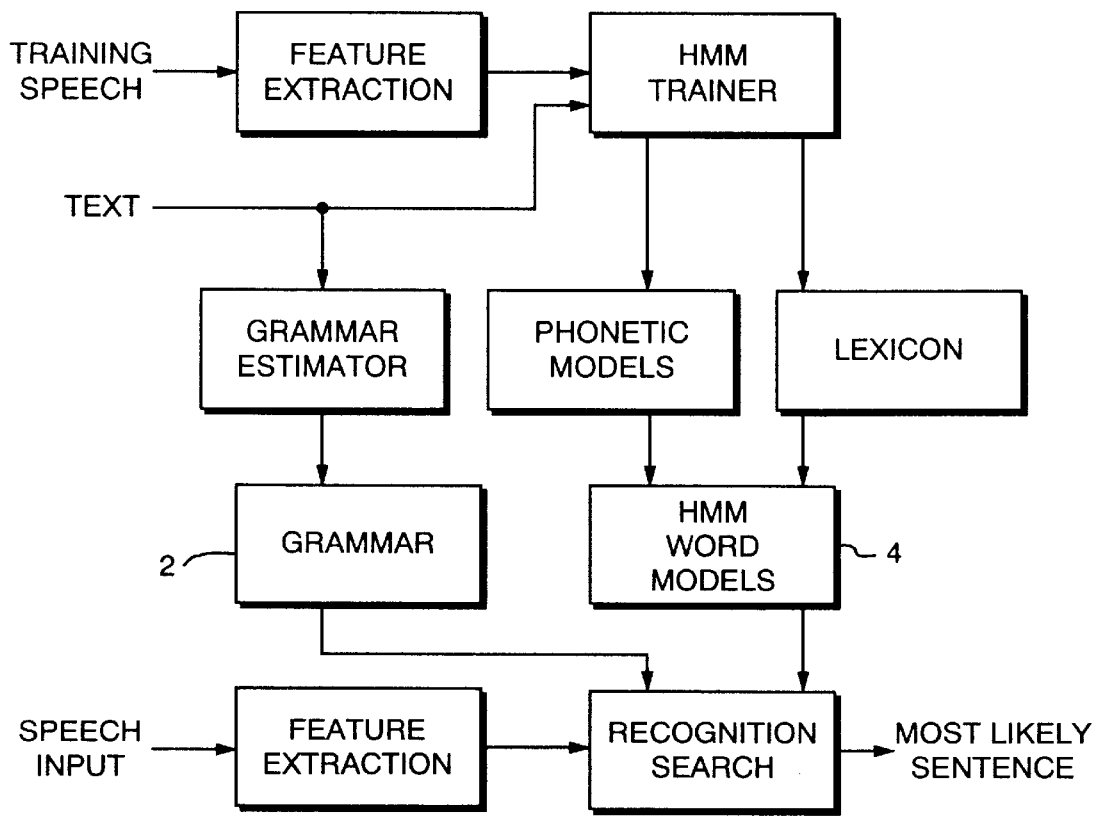
FIG. 1 is a prior art block diagram of a system for speech recognition.

The present invention is an improvement on the system apparatus and method included in FIG. 1. The general blocks in FIG. 1 describe a general recognition scheme that could form the basis for a preferred embodiment of the present invention. The present invention, however, includes additions, changes, and specifics to the portion of the block diagram of FIG. 1. Differences include the phonetic models and the HMM word models, and their respective generation and use as described below. These differences are not anticipated nor suggested in the Makhoul and Schwartz paper referenced above. The parts of FIG. 1, as described above, that are common to a preferred embodiment of the present invention include the training portion wherein features are extracted from the training utterances, a grammar 2, and word models 4 are developed from inputting actual voiced utterances. The text of these utterances is also input and an iterative process as described in the above referenced Makhoul and Schwartz paper to produce a database of HMM word models. The result of the training is that a particular sequence of words that has the highest probability to corresponds to the recognized sequence of phonemes is developed. The recognition process extracts the same features as in the training process, and a particular sequence of words is found having the highest probability to correspond to an unknown input sequence of utterances. A grammar is required for recognition of sentences. The Makhoul and Schwartz paper describes a grammar on page 9960. Such grammars are well known and described in the art. Since the present invention is directed to the distinguishing of different dialects, any grammar could be used to advantage with the present invention.

Figure 2:
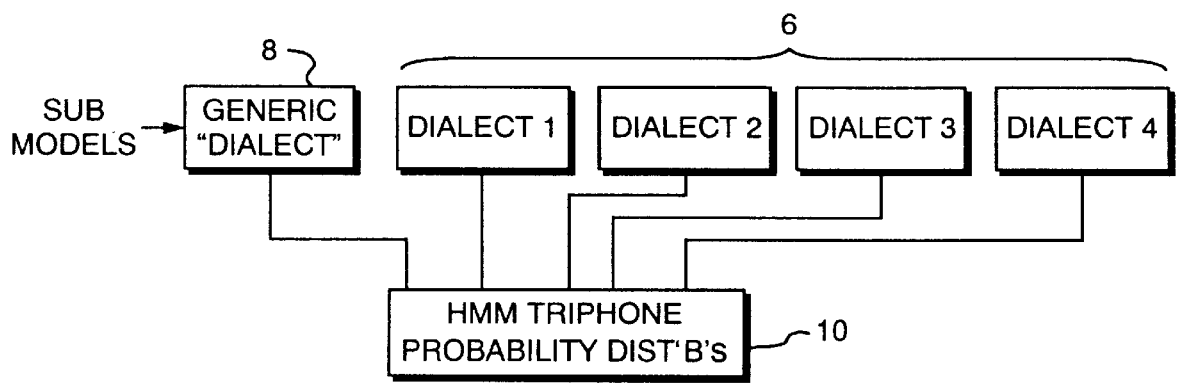
FIG. 2 is block diagram of an embodiment of part of the present inventions.

FIG. 2 shows a preferred embodiment improvement of the present invention. This improvement includes the development of several HMM word models. But, without a proportional increase in memory size nor the exponential increase in software complexity, computer speeds and time to effectively use these additional models. In a preferred embodiment, as shown in FIG. 2, the present invention provides five different databases 6 of specific dialects 1–4 together with a generic version 8 of the spoken words. Usually this generic is dialect or accent free. There is a separate database of HMM triphoneme probability distributions that are common to all the models—they are shared by all sub models. This sharing requires substantially less memory, computer speed and software complexity. The more sharing the less computer resources needed. The different dialects may be, in some preferred embodiments, compiled to distinguish genders, geographic regions, age. Other speaker differences may also be accommodated, such as foreign born speakers. The present invention utilizes a separate mapping of the dialects with the HMMs. This common pool of HMMs, or statistical acoustic descriptors, supports multiple models by selecting a different map, or combination of HMMs for each sub model. In FIG. 2, each sub model is comprised of triphonemes from the various dialects and the generic sub model. It is important to note that a triphoneme is a single given phoneme where the phonemes on either side of the given phoneme affects the features associated with that given phoneme. For any given dialect, the triphonemes are modelled by discrete probability functions that are selected from a common pool used for all dialects. A lexicon or words and their phonetic spelling, and triphonemes mapped to probability distribution functions for the different dialects are provided to give HMM word models for each dialect. Adding a grammar allows the invention to determine the most probable sentence spoken.

Figure 3:
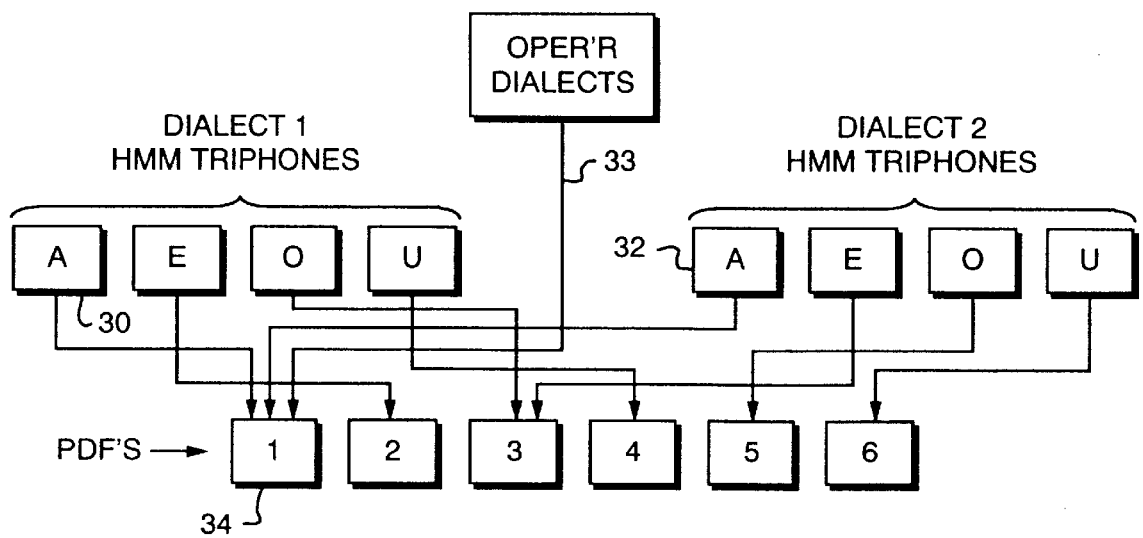
FIG. 3 is a block diagram of a part of a preferred embodiment of the present invention.

FIG. 3 shows in block diagrammatic form the process for generating an HMM word model for a given dialect by the mapping technique of the present invention. In prior art techniques, for each triphoneme there would be a probability distribution function developed and assigned from the training. In comparison, in the present invention as shown in FIG. 3, the triphonemes from two different dialects share common probability density functions. Many such dialects 33 can share the same probability density function. This technique provides for substantial saving in computer storage. In particular in FIG. 3, the "A" 30 of dialect 1 and the "A" 32 of dialect 2 share the same probability density function 34 (PDF #1), as may the "A" of other dialects 33. Moreover, the same PDF #3 is used by the sound associated with "O" in dialect 1 and the sound associated with "E" in dialect 2. This process of associating a triphoneme with a PDF (from a common database of PDFs) for a given dialect is called mapping—a term of art well known in field using computer operations. In this mapping each triphoneme has a pointer to a particular PDF from the common database of PDFs. The result of this mapping is a database constructed of HMM word models used for recognition. A more complex arrangement, not shown, can be made, where each of the states of the triphoneme Hmm can have a pointer to a particular PDF. In this case, a voting technique, as discussed below can be used to determine how the triphoneme and the PDFs are manipulated to yield an HMM word model.

Figure 4:
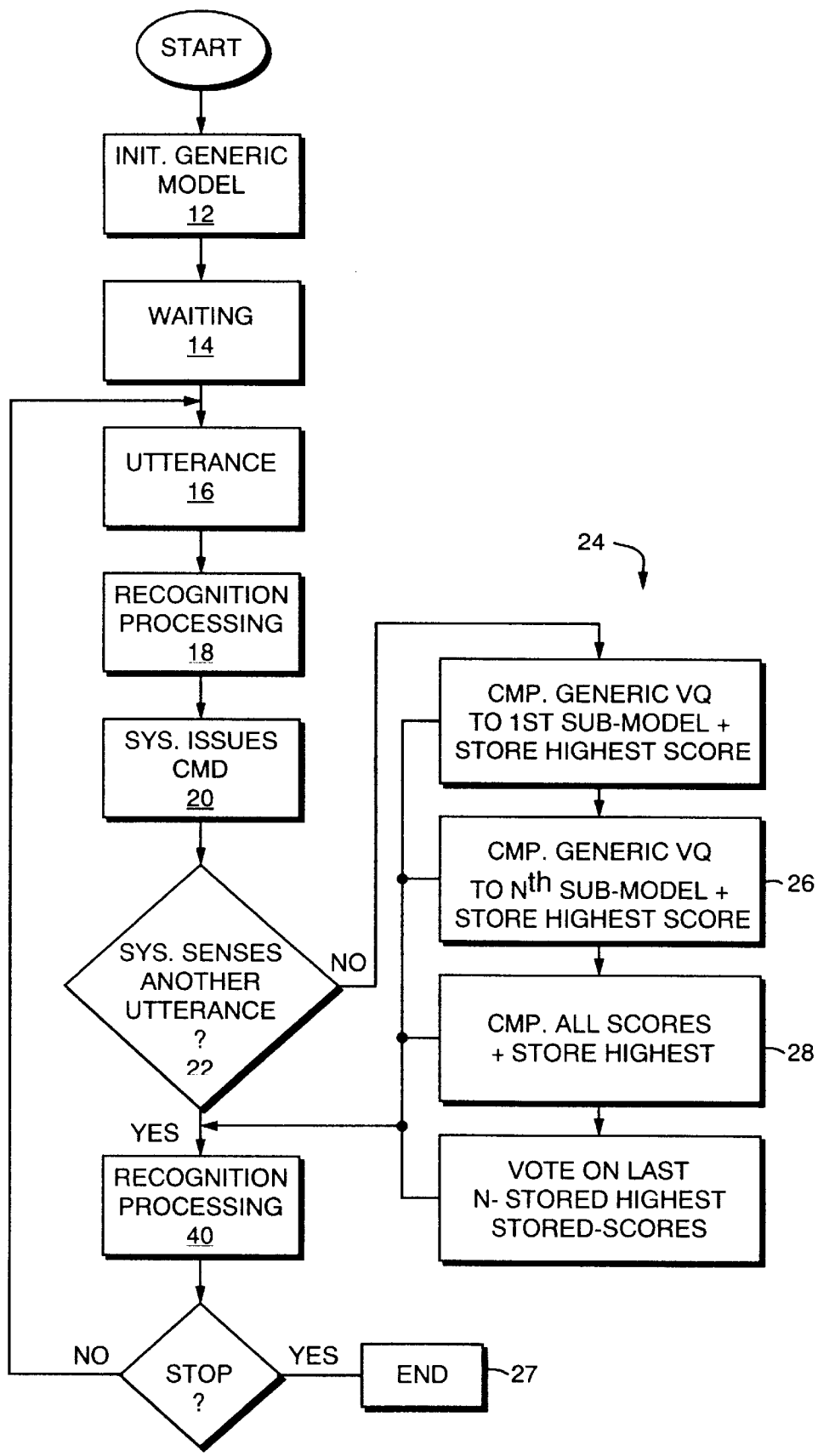
FIG. 4 is a flow chart of a preferred embodiment of the present invention.

FIG. 4 is a flow chart of a preferred embodiment of the present invention. In this preferred embodiment a group of accessories are voice controlled. For example, saying, "turn on the lights" will cause the lights to be turned on. The apparatus and software are then activated to initially select one of the sub models 12. Typically, the generic model 8 (of FIG. 2) is selected. The system waits 14 for an utterance 16 to begin the recognition process 18. The utterance is recorded in a form to preserve the features and information of the actual speech. This can be a digitization of the utterance with a sample rate at least twice that of the highest frequency (as much as 20 KHz may be expected resulting in a 40 KHz sampling rate) expected and a precision, or number of bits in an analog to digital recorder, suitable for the dynamic range expected. For example as little as eight bits could be used, but 12 or 16 is preferable, and upwards of mote than twenty bits may be necessary from time to time. The hardware necessary to digitize such utterances, as well as the computer needed are known in the art. The preceding numbers are simply representative and provided to give some milepost to the hardware design. Analog hardware, including filtering and feature extraction may be used as known in the art. The recognition process continues with the extraction of features, such as volume, pitch, spectrum. These are the same features used to train the system as described in FIG. 1. The extracted features are compared to the model features for the generic dialect (if selected). These features are formed and stored in a vector form as described in the Makhoul and Schwartz paper. The system then compares the HMM word models with the utterance and the grammar to determine the word sequence which has the highest probability of matching the utterances. That probability score is saved. In this preferred embodiment, the command that corresponds to the word sequence recognized is issued 20. If there is a wait 22, the features and the word sequence is compared to all the other dialects 24 and the probability scores are saved. If one of the sub models for the dialects produces a higher score (see below) than did the generic model that dialect is selected for recognition of the next utterances. The process is repeated until disabled 27.

With reference to FIG. 4, item 24 is the group of block depicting the recognition as applied to the various dialects. The utterances are compared to the features and mapped HMM word models 26 developed for each dialect. As each utterance is processed, the highest score is recorded 28. However, since there may be a different dialect recording the highest score for subsequent utterances, a voting process is used to determine the best dialect model to be selected. One such voting technique is to determine the best dialect model for each utterance, and then to take the dialect model that was most frequently selected. If there is a tie, arbitrarily select one of the dialect models. Another, more sophisticated voting method, includes calculating a normalized difference in the highest score recorded for each dialect model as applied to each utterance. The calculation begins by taking the dialect with the best score. Next a weight is assigned to each of the other dialect models depending upon how distant each dialect model score is from the best model score. If any other dialect model score is close the highest score the weight given that dialect model is also close the weight of the highest scoring dialect model. The voting process is to accumulate a small set or recent utterances and to calculate the choice of model that maximizes the sum of the preference weights over the number of utterances. For example, the calculation proceeds by taking the sum of the weights for each the different models as applied to each of the utterances accumulated, and select the dialect model that provides the maximum sum. This technique empirically results in minimizing the error rate the user experiences when using the system. Other voting techniques are well known in the art and can be used to advantage herein.

If the above technique does not perform accurately as might be required, the technique can be adapted to a particular speaker. In a particular embodiment, say for the control of the accessories of a vehicle, the training can be done with the same speaker that will later use the voice commands to operate those accessories. The accuracy of this type of system has been found to be more accurate. See the Makhoul and Schwartz paper, at page 9962.

Figure 5:
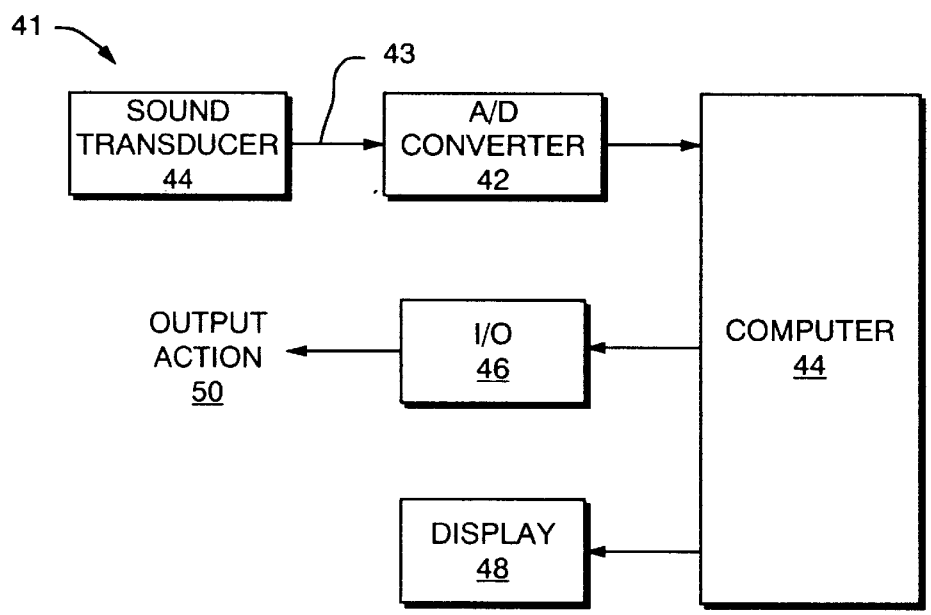
FIG. 5 is a block diagram of a system for recognizing dialect of speech and active command outputs.

FIG. 5 is a block diagram of the basic hardware needed to build a system to recognize dialect of speech and active command outputs if desired. Voice input 41 is received by a microphone or sound transducer. The transducer 40 will ordinarily convert the sound to an electrical signal 43. That electrical signal is fed to an analog to digital converter 42 where the signal is digitized with timing and a precision that the recognition might require. That is, for very simple commands, 8 bits digitized at 4 KHz (to capture frequencies up to 2 KHz) may be sufficient. Whereas to recognize very subtle differences 16 or 20 bits digitized at rates of 40 KHz may be required. The digitized signal is stored in a computer 44. The computer having enough memory and processing power to accommodate the recognition tasks. Possibly and lap-top to a 32 or 64 bit personal computer. Of course, more power computer may be used. Typically there will be a display 48, and if the recognition requires an output function to be executed or activated the I/O 46 to perform the task 50 would be needed. The task could be activating a relay or a motor to a series of timed outputs.

It will now be apparent to those skilled in the art that other embodiments, improvements, details and uses can be made consistent with the letter and spirit of the foregoing disclo-

What is claimed is:

1. A computer implemented method of processing voiced speech for modeling speech for a segmented population of speakers, each segment formed by use of a dialect and/or by use of dissimilar channels, comprising the steps of:

inputting and storing oral utterances of words from each segment, physically extracting a set of features from the oral utterances of each segment, compiling a database of acoustic descriptors of said utterances for each segment, establishing a database of probability density functions associated with said utterances, relating said probability density functions with said acoustic descriptors of all said segments, wherein at least one probability density function is related or mapped to at least two acoustic descriptors in at least two respective segments, and combining said features, said acoustic descriptors and said probability density functions together to determine the best model for each segment.

2. The method as defined in claim 1 further comprising the steps of:

forming a lexicon of words to be recognized, forming a phonetic spelling of those words, and wherein said combining said features, said acoustic descriptors and said probability density functions result in a statistical word model.

3. The method as defined in claim 1 further comprising the steps of:

receiving an unknown utterance, extracting said features from the unknown utterance, extracting first acoustic descriptors from said unknown utterance, relating each of said first acoustic descriptors with the associated probability density function of each segment, determining the probabilities of each result of relating the first acoustic descriptor to the probability density functions for each segment, comparing said probabilities, determining the highest probability and relating said highest probability to the corresponding segment.

4. The method as defined in claim 3 wherein said determining the highest probability segment comprises the steps of:

determining and storing the most probable segment of each unknown utterance received, determining which segment was most often stored, denoting that segment as the most probable segment for said unknown utterances.

5. The method as defined in claim 3 further comprising the steps of:

storing the probabilities of each result of relating the first acoustic descriptor to the probability density function for each segment, creating a weighted function related to the stored probabilities, adding the weighted functions for each of the segments, selecting the segment having the highest total after such adding.

6. The method as defined in claim 3 further comprising the steps of:

forming a lexicon of words to be recognized, forming a phonetic spelling of those words, wherein said combining said features, said acoustic descriptors and said probability density functions result in a statistical word model, generating a grammar, combining said statistical word models and said grammar to determine the most probable recognized sentences spoken.

7. The method as defined in claim 6 further comprising the steps of:

generating a table of action outputs related to said recognized sentence, and activating said output action.

8. Apparatus for modelling different segments, each segment formed by use of a dialect and/or by use of dissimilar channels, of speech comprising:

a sound transducer for receiving utterances, an analog to digital converter for converting said received utterances into digital signals suitable for computer operations, means for extracting features from said digital signals, means for compiling a database of acoustic descriptors of said utterances for each segment, establishing a database of probability density functions associated with said utterances, means for relating said probability density functions with said acoustic descriptors, where at least two acoustic descriptors in two respective segments are mapped or pointed towards one probability density function, means for combining said features, acoustic descriptors and probability density functions to determine the best model for each segment.

9. The Apparatus as defined in claim 8 further comprising:

a lexicon of words to be recognized, a database of phonetic spellings of said words, means for combining said features, said acoustic descriptors and said probability density functions to form a statistical word model for each of said words.

10. The Apparatus as defined in claim 9 further comprising:

a grammar, and means for combining said word models and said grammar to determine the most probable recognized sentences spoken.

11. The Apparatus as defined in claim 10 further comprising means for activating an output indicated from the most probable recognized sentence.

12. A computer readable memory having stored thereon a composite database of modeled segments of speech, each segment formed by use of a dialect and/or by use of dissimilar channels wherein oral utterances are input into a computer for each segment and physical features of the utterance are extracted, comprising:

a first database of acoustic descriptors, a second database of probability density functions common to all said segments, and a pointer database wherein for each segment a pointer relates each of said acoustic descriptors with one probability density function, and wherein at least two of said acoustic descriptors in two different segments point to one probability density function, such that, together with the features, the best model for each segment is established.

* * * * *